US006181514B1

(12) United States Patent
Santini et al.

(10) Patent No.: US 6,181,514 B1
(45) Date of Patent: Jan. 30, 2001

(54) SCALED WRITE HEAD WITH HIGH RECORDING DENSITY AND HIGH DATA RATE

(75) Inventors: Hugo Alberto Emilio Santini; Mason L. Williams, III, both of San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/205,476

(22) Filed: Dec. 4, 1998

(51) Int. Cl.[7] .............................. G11B 5/147; G11B 5/17
(52) U.S. Cl. ......................... 360/126; 360/119; 360/123
(58) Field of Search ................................. 360/119, 120, 360/123, 125, 126, 113, 317

(56) References Cited

U.S. PATENT DOCUMENTS

| | | | |
|---|---|---|---|
| 4,539,616 | * 9/1985 | Yuito et al. | 360/125 |
| 4,636,897 | * 1/1987 | Nakamura et al. | 360/119 |
| 4,651,248 | * 3/1987 | Shiiki et al. | 360/119 |
| 4,751,599 | * 6/1988 | Katou | 360/126 |
| 4,881,144 | * 11/1989 | Yuito et al. | 360/125 |
| 5,032,944 | * 7/1991 | Ohdoi | 360/126 |
| 5,198,949 | * 3/1993 | Narisawa et al. | 360/126 |
| 5,241,440 | * 8/1993 | Ashida et al. | 360/126 |
| 5,486,968 | * 1/1996 | Lee et al. | 360/126 |
| 5,515,221 | * 5/1996 | Gill et al. | 360/113 |
| 5,606,478 | * 2/1997 | Chen et al. | 360/126 |
| 5,621,596 | * 4/1997 | Santini | 360/126 |
| 5,798,897 | 8/1998 | Chang et al. | 360/126 |
| 5,812,350 | * 9/1998 | Chen et al. | 360/126 |

FOREIGN PATENT DOCUMENTS

| | | |
|---|---|---|
| 58-098822 * | 6/1983 | (JP) . |
| 1-128215 * | 5/1989 | (JP) . |
| 2-094013 * | 4/1990 | (JP) . |
| 5-151534 * | 6/1993 | (JP) . |
| 7-078312 * | 3/1995 | (JP) . |
| 8-138211 * | 5/1996 | (JP) . |

* cited by examiner

Primary Examiner—William Klimowicz
(74) Attorney, Agent, or Firm—Gray Cary Ware & Freidenrich LLP; Ervin F. Johnston

(57) ABSTRACT

The present invention provides a scaled down write head which has a high recording density and a high data rate. A significant dimension not scaled down proportionally is the thickness of the write coil layer so as to prevent heating of the head. The thickness of the write coil layer is equal to or greater than the thickness of the second pole piece layer. The insulation stack of the write head employs a nonorganic first insulation layer and only one baked photoresist layer which is a second insulation layer. A third insulation layer of the insulation stack may be provided by an extension of the write gap layer. With a lower stack height and with first and second pole pieces that are thinner, a well-defined second pole tip is constructed without reflective notching. The write gap layer is constructed after the other insulation layers of the insulation stack so as to prevent a reduction of its thickness during construction of the write coil layer. The data rate is increased by decreasing the thicknesses of the first and second pole piece layers which reduced thicknesses are enabled by decreasing the pitch of the write coil layer and moving the write coil layer closer to the ABS.

42 Claims, 8 Drawing Sheets

SCALED WRITE HEAD WITH HIGH RECORDING DENSITY AND HIGH DATA RATE

BACKGROUND OF THE INVENTION

1. Field of the Invention

The present invention relates to a scaled write head with high recording density and high data rate and, more particularly, to a write head where significant dimensions have been scaled downwardly proportionally except for thickness of a write coil layer and apex angle of an insulation stack.

2. Description of the Related Art

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS causing the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A write gap layer between the first and second pole piece layers forms a magnetic gap at an air bearing surface (ABS) of the write head. The pole piece layers are connected at a back gap. Current conducted to the coil layer induces a magnetic field across the magnetic gap between the pole pieces. This field fringes across the magnetic gap for the purpose of writing information in tracks on moving media, such as the circular tracks on the aforementioned rotating disk or a linearly moving magnetic tape in a tape drive.

The read head includes first and second shield layers, first and second gap layers, a read sensor and first and second lead layers that are connected to the read sensor for conducting a sense current through the read sensor. The first and second gap layers are located between the first and second shield layers and the read sensor and the first and second lead layers are located between the first and second gap layers. The distance between the first and second shield layers determines the linear read density of the read head. The read sensor has first and second side edges that define a track width of the read head. The product of the linear density and the track density equals the areal density of the read head which is the bit reading capability of the read head per square inch of the magnetic media.

A significant factor in achieving gigabyte densities in computers has been increasing the track density of the write head. Track density is expressed in the art as tracks per inch (TPI) which is the number of tracks that the write head can write per inch of width of a rotating disk or linearly moving magnetic tape. In order to achieve high track density it is necessary that the second pole tip have a narrow width, which width is referred to in the art as track width. This pole tip is typically the second pole tip of the write head. Considerable research has been undertaken to provide submicron track widths for increasing the track density. The track width is measured between first and second side walls of the second pole tip at the ABS. It is important that these side walls be straight and well-formed so that the width is uniform between the side walls from the bottom to the top of the second pole tip. If these side walls are irregular the write head will write a poor magnetic impression into the rotating disk and the track width will be unpredictable from head to head.

A problem in constructing a highly defined narrow track width second pole tip has been "reflective notching" which occurs during the construction of the second pole tip at the ABS. The second pole piece layer is constructed after constructing the insulation stack which insulates one or more coil layers. After constructing the insulation stack a seed layer is sputter deposited on the insulation stack for frame plating the second pole piece layer. This seed layer, which is typically nickel iron (NiFe), is highly reflective to light. Next, a photoresist layer is spun on a wafer where the magnetic head is to be constructed. The photoresist layer has a height on top of the insulation stack and a depth in a pole tip region where the second pole tip is to be constructed. Since the photoresist layer tends to be planarized, due to the spinning operation, the depth of the photoresist in the pole tip region is greater than the height of the photoresist above the insulation stack. Next, the photoresist layer is photoimaged exposing a region of the photoresist layer that is to be removed. This region is then removed by a developer which provides an opening in the photoresist layer where the second pole piece and second pole tip are to be formed. Unfortunately, light can be reflected into regions adjacent the first and second side wall sites of the second pole tip which, upon developing, removes portions of the photoresist mask adjacent the first and second side walls. These portions are irregular in shape and, upon plating the second pole piece and second pole tip, causes the second pole tip to have irregularly shaped side walls. This unwanted light reflection occurs behind a flare point of the second pole piece layer. The flare point is where the second pole piece layer first commences to widen after the pole tip region. The sloping surfaces of the insulation stack behind the flare point are the reflective regions which reflect the unwanted light adjacent the first and second side walls of the second pole tip. Accordingly, the prior art tends to locate the flare point further from the ABS so that the amount of light reflection is minimized. Unfortunately, the longer the pole tip region between the flare point and the ABS the greater the magnetic saturation of the second pole tip, which reduces the recording strength of the write head. Factors bearing upon the degree of reflective notching are the height of the insulation stack, the proximity of the insulation stack to the ABS, the location of the flare point and the apex angle. The apex angle is the angle that the insulation stack takes with respect to the plane of the write gap layer. As this angle becomes less than 45° there is less light reflected into the regions adjacent the second pole tip region. The height of the insulation stack also bears on the thickness of the photoresist in the pole tip region. The greater this thickness the greater the dispersion of light during the light exposure step, which causes poor resolution of the light at the bottom of the photoresist where the side walls are to be formed. Reflective notching is fully explained in commonly assigned U.S. Pat. No. 5,798,897 which is incorporated by reference herein. Reflective notching has been a serious problem in obtaining high track width densities.

Another factor bearing upon high density magnetic disk drives is the linear recording density of the write head. Linear recording density is measured in bits per inch (BPI), which is the number of bits that can be written by the write head per linear length of a track along the magnetic disk. Linear bit density is directly dependent upon the length of the write gap between the first and second pole tips. This length is equal to the thickness of the write gap layer. A major problem in obtaining thin write gap layers has been the processing steps in constructing the insulation stack, which steps typically are subsequent to construction of the write gap layer. After construction of the write gap layer the first insulation layer of the insulation stack is constructed on top of the first pole piece layer, the write coil layer is frame plated on the first insulation layer, the second insulation layer is formed on the write coil layer and a third insulation layer is typically employed for smoothing out the ripples of the second insulation layer. The insulation layers are hard baked photoresist. Photoresist is spun on the wafer, light exposed in areas that are to be removed by a developer. After constructing all of the insulation layers they are then hard baked so that they become hard. The write coil layer is constructed by frame plating. A photoresist layer is spun on the head, light exposed in the regions to be removed and then developed. After frame plating the write coil layer the photoresist is removed and the wafer is ion beam milled in order to remove all portions of the seed layer except the seed layer underneath the write coil layer. It is this ion beam milling step, in particular, that reduces the thickness of the write gap layer causing this thickness to be unreliable. Accordingly, the prior art tends to deposit a thicker write gap layer to account for the ion beam milling operation.

The product of the track density and the linear density of the second pole tip determine the overall recording density of the write head. This product is known in the art as "areal density". Another factor rating the capability of the write head is its data rate. The data rate of the write head is its frequency of writing bits of information into the circular tracks of the rotating disk. The data rate is inversely proportional to the inductance of the write head. Inductance is directly proportional to the length, width and thickness of the first and second pole piece layers. Accordingly, it is desirable to reduce the size of these layers in order to increase the data rate.

Another concern with a write head is the heat generated by it while operating in a disk drive. A write current is conducted through the write coil at high frequencies which generates heat. The amount of heat generated is inversely proportional to the cross section of the turns of the coil. Because of the different coefficients of expansions of materials in the write head, such as photoresist for the insulation stack and aluminum oxide ($Al_2O_3$) for an overcoat layer covering the write head, the heat can cause a protrusion problem at the air bearing surface. The heat causes the insulation stack to expand more than the overcoat layer which results in the overcoat layer being pushed forward beyond the ABS. While it is desirable to decrease the thickness of the write coil layer in order to reduce the height of the insulation stack so as to minimize reflective notching, this is difficult to do because of the heat generated by the smaller coil layer.

SUMMARY OF THE INVENTION

The present invention scales down proportionally most of the significant dimensions of a write head in order to achieve a higher recording density and a higher data rate than that achieved by the prior art. One dimension not scaled down proportionally is the thickness of the write coil. Another dimension not scaled down proportionally is the apex angle which is the angle that the insulation stack takes with respect to the plane of the write gap layer. This angle remains at between 20° and 25°. As stated hereinabove, the lower this angle below 45° the lower the amount of reflective notching will occur adjacent the second pole tip region. The dimensions scaled down are the thickness of the write gap layer, the zero throat height, the distance of the coil layer from the ABS, the pitch of the coil (distance between commencement of one turn to commencement of adjacent turn of the coil layer), the thicknesses of the first and second pole piece layers, the height of the insulation stack and the flare point. The invention has achieved a scaling down of all these factors without increasing reflective notching, degrading the write gap layer, decreasing the data rate or increasing the generation of heat within the head. A lower stack height has been accomplished, even though the write coil layer has not been scaled down proportionally. This has been achieved by providing a unique combination of insulation layers in the insulation stack. Instead of the first insulation layer employing a baked photoresist material, the first insulation layer is a thin layer of aluminum oxide ($Al_2O_3$), silicon dioxide ($SiO_2$) or silicon (Si) formed directly on top of the first pole piece layer. The write coil layer is formed by frame plating on the first insulation layer followed by formation of a hard baked photoresist second insulation layer. The second insulation layer fills in the spaces between the turns of the coil and covers the top of the coil sufficiently to insulate the coil from the second pole piece layer. The second insulation layer can be the only baked photoresist layer in the insulation stack. Because of this reduced height there will be less reflective notching of the second pole tip, as discussed hereinabove. Reflective notching is still further minimized by employing a scaled down thickness of the second pole piece layer. Since the second pole piece layer is thinner the thickness of the photoresist patterning layer is thinner so that light penetration during the light exposure step is more effective. We have found that the thickness of the write coil layer can be equal to or greater than the thickness of the second pole piece layer. With the aforementioned arrangement the apex angle can be kept between 20° and 25°, which is desirable for minimizing reflective notching.

In a preferred embodiment of the invention the write gap layer is constructed after the construction of the insulation stack so that the processing steps in constructing the insulation stack do not alter the thickness dimension of the write gap layer. Accordingly, after constructing the insulation stack and before frame plating the second pole piece layer, the write gap layer is deposited on top of the first pole piece layer in a pole tip region and is preferably also deposited on top of the insulation stack in a yoke region. The processing steps in constructing the second pole piece layer do not alter the thickness dimension of the write gap layer. The extension of the write gap layer on top of the insulation stack provides additional insulation between the coil layer and the second pole piece layer. Accordingly, the thickness of the second insulation layer baked photoresist can be reduced because of the insulation provided by the extended write gap layer over the insulation stack.

Further, the invention scales down the length and thickness of the first and second pole piece layers. This is accomplished by scaling down the pitch of the write coil layer as well as the distance of the write coil layer from the air bearing surface. With the reduced pitch of the write coil the write current field is increased so that the length of the second piece can be decreased. The reduction of the distance of the coil layer from the ABS also decreases the length of the second pole piece layer. The reduced thickness of the second pole piece layer has been made possible by the reduction of other significant dimensions of the write head. Since the second pole piece layer has been scaled down, it then follows that the first pole piece layer can be scaled down accordingly. With less material in the first and second pole piece layers there is less inductance which equates to a higher data rate.

As stated hereinabove, the thickness of the write coil layer has not been scaled down proportionally. Accordingly, no additional heat is generated by the present write head, which heat can cause a protusion problem at the ABS. Further, the aforementioned materials for the first insulation layer of the insulation stack dissipate heat better than the prior art baked photoresist layer.

An object of the present invention is to provide a scaled down write head which has a high recording density and a high data rate.

Another object is to provide a write head which has a well-defined second pole tip and a write gap layer that has a reliably defined thickness at the ABS.

A further object is to provide a write head that is scaled down without causing a protrusion problem at the ABS.

Another object is to provide a write head which has a lower stack height even though a thickness of a write coil layer is not scaled down proportionally with other parameters of the write head.

Still another object is to provide a method of constructing a scaled down write head which does not increase reflective notching, decreases alteration of the write gap thickness, increases the data rate and reduces protrusion at the air bearing surface.

Other objects and advantages of the invention will become apparent upon reading the following description taken together with the accompanying drawings.

DESCRIPTION OF THE PREFERRED EMBODIMENTS

Figure 1:
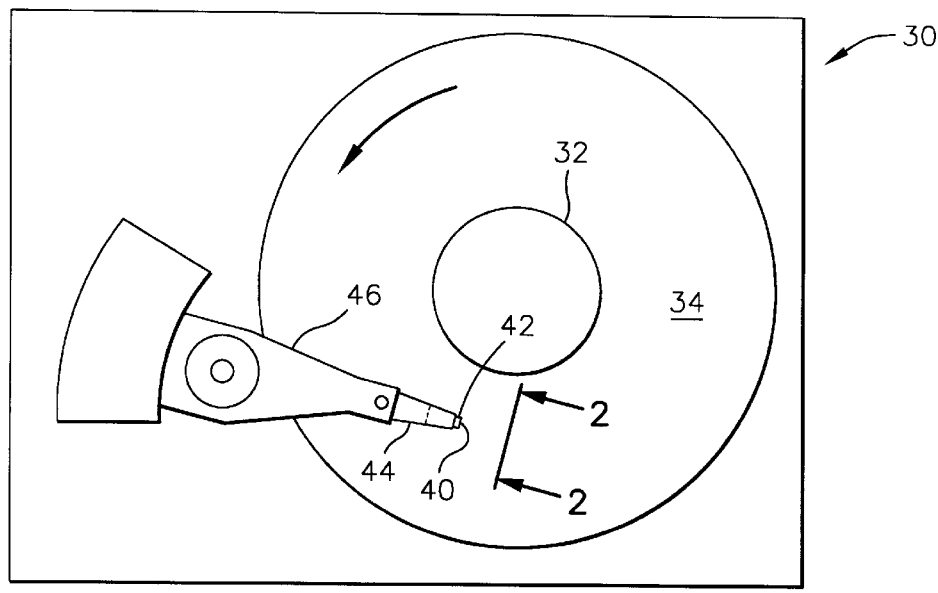
FIG. 1 is a planar view of an exemplary magnetic disk drive.
Figure 2:
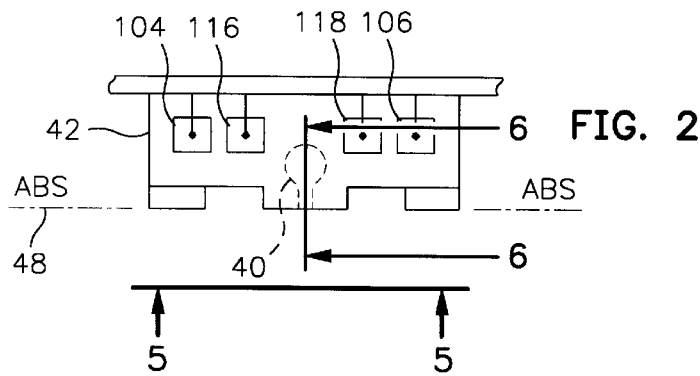
FIG. 2 is an end view of a slider with a magnetic head of the disk drive as seen in plane 2—2.
Figure 3:
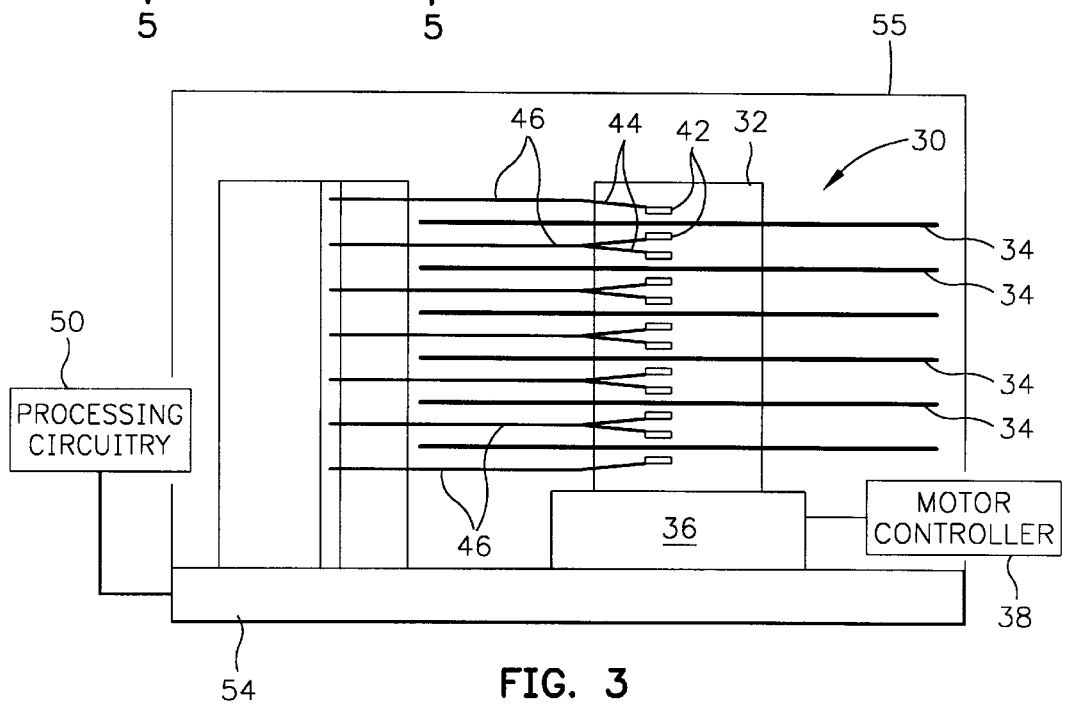
FIG. 3 is an elevation view of the magnetic disk drive wherein multiple disks and magnetic heads are employed.
Figure 4:
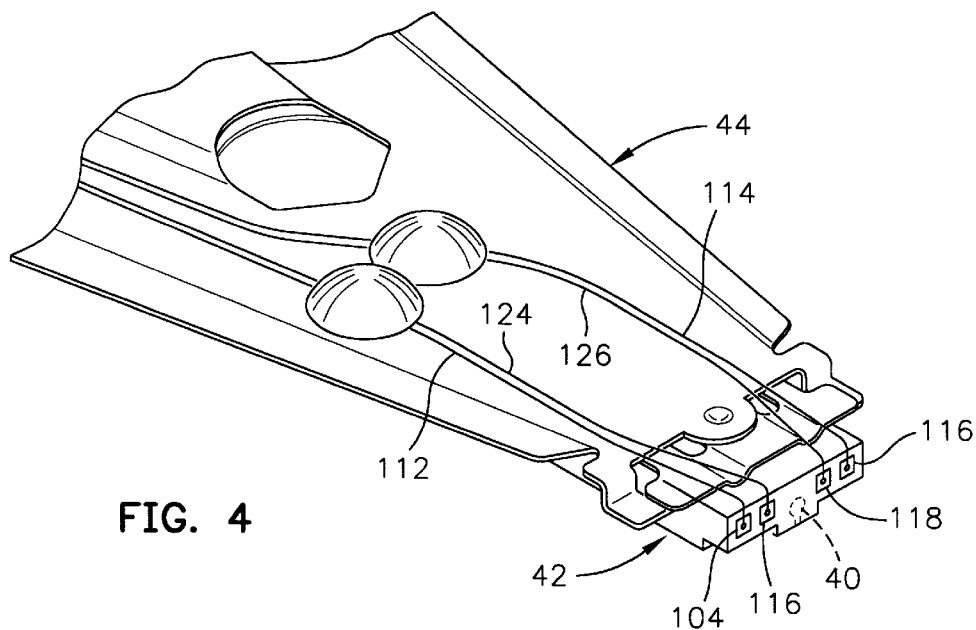
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54 of a housing 55, as shown in FIG. 3.

Figure 5:
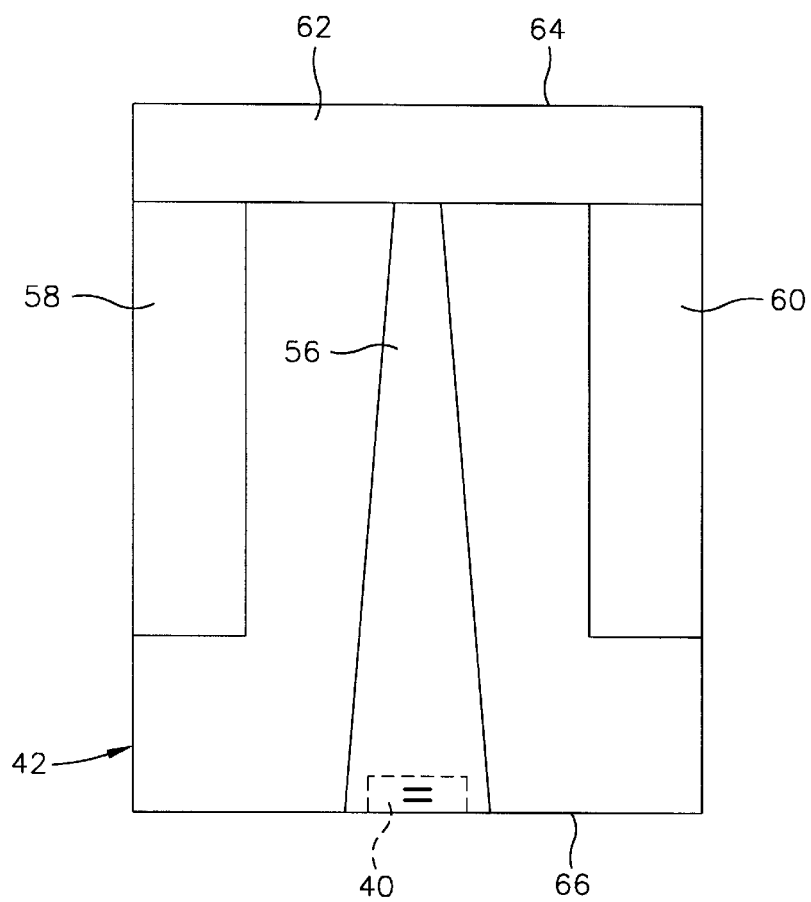
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Merged Magnetic Head

Figure 6:
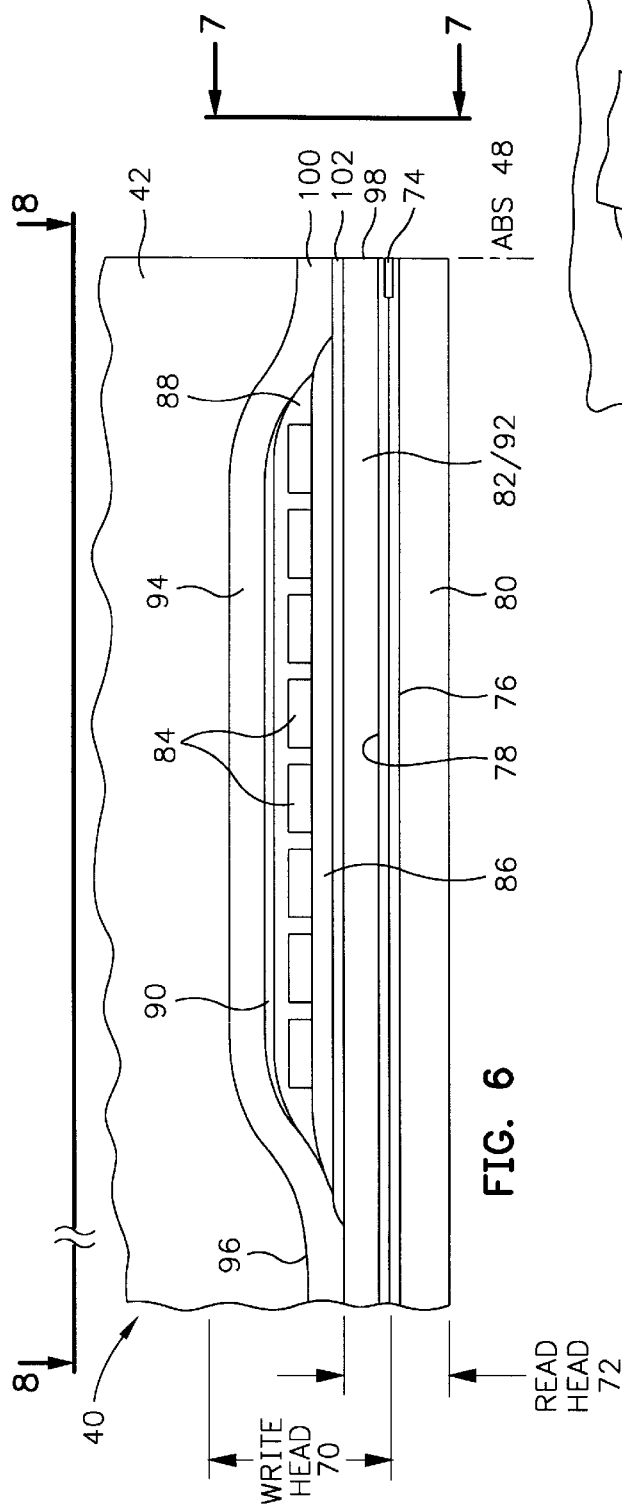
FIG. 6 is a partial view of the slider and a prior art magnetic head as seen in plane 6—6 of FIG. 2.
Figure 7:
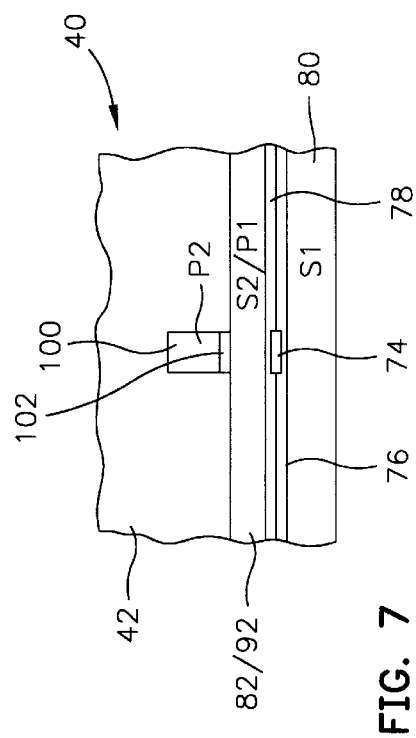
FIG. 7 is a partial ABS view of the slider taken along plane 7—7 of FIG. 6 to show the read and write elements of the prior art magnetic head.

FIG. 6 is a side cross-sectional elevation view of the merged MR or spin valve head 40 which has a write head portion 70 and a read head portion 72, the read head portion employing an MR or spin valve sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
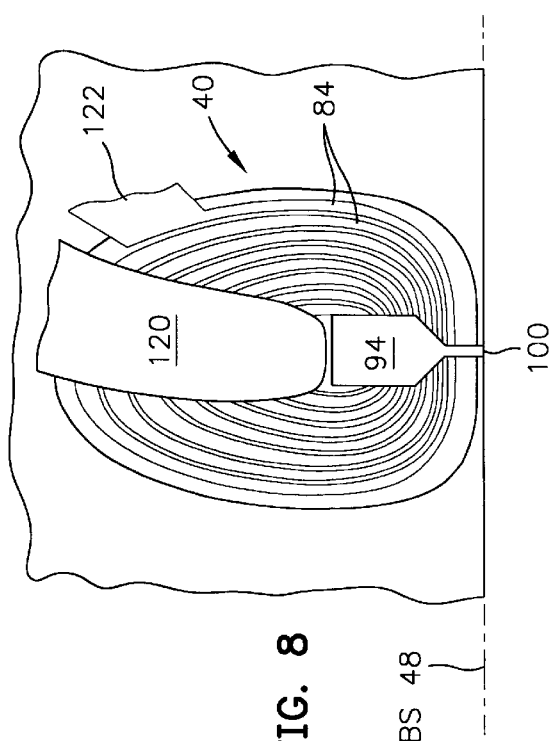
FIG. 8 is a view taken along plane 8—8 of FIG. 6 with the insulation stack removed.

The write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second connections 104 and 106 connect leads from the sensor 74 to leads 112 and 114 on the suspension 44 and third and fourth connections 116 and 118 connect leads 120 and 122 from the coil 84 (see FIG. 8) to leads 124 and 126 on the suspension. It should be noted that the merged head 50 employs a single layer 82/92 to serve a double function as a second shield layer for the read head and as a first pole piece for the write head. A piggyback head employs two separate layers for these functions.

Present Invention

Figure 9:
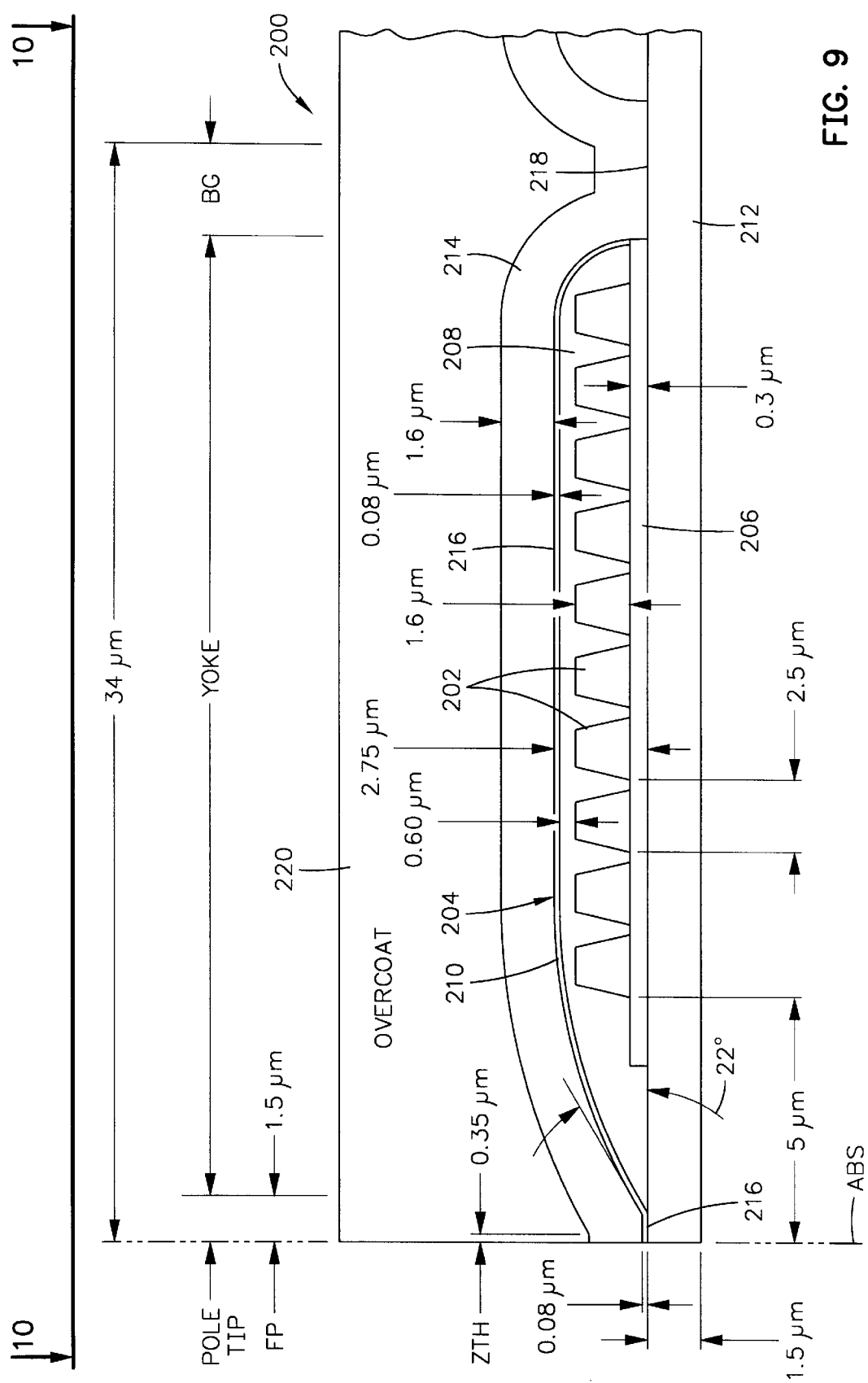
FIG. 9 is a side elevation view of the present write head.

The present write head 200 is illustrated in FIG. 9. The write head includes a write coil layer 202 which is embedded in an insulation stack 204. The insulation stack includes a first insulation layer 206, a second insulation layer 208 and preferably a third insulation layer 210, which will be described in more detail hereinafter. The insulation stack is located between first and second pole piece layers 212 and 214 in a yoke region of the head. A write gap layer 216 is located between the first and second pole piece layers 212 and 214 in a pole tip region of the head. The first and second pole piece layers 212 and 214 are connected at a back gap (BG) 218. Accordingly, when a write current is conducted through the write coil 202 a write coil field is induced in the first and second pole piece layers 212 and 214 which causes magnetic flux to fringe across the gap layer 216 between pole tip portions of the first and second pole pieces at the ABS.

All significant dimensions of the write head have been scaled down proportionally except the thickness of the write coil layer 202 and the apex angle which is shown as 22° in FIG. 9. The thickness of the write coil layer was purposely not scaled down proportionally so as not to generate undue additional heat which potentially could cause the insulation stack to expand and protrude the overcoat layer 220 at the ABS. Instead of employing a typical hard baked photoresist layer for the first insulation layer 206 of the insulation stack, the present invention employs a nonorganic material for this layer, such as aluminum oxide ($Al_2O_3$), silicon dioxide ($SiO_2$) or silicon (Si). This layer has been scaled down to a thickness range of 0.25 μm to 0.50 μm with an exemplary thickness of 0.5 μm. The coil layer 202 has a thickness range of 1.50 μm to 1.75 μm with an exemplary thickness of 1.6 μm. The second insulation layer 208 is a baked photoresist layer and has a thickness above the top of the write coil layer in the range of 0.5 μm to 0.65 μm with an exemplary thickness of 0.60 μm. In the preferred embodiment the write gap layer 216 is extended over the top of the second insulation layer 208 which provides the third insulation layer 210 for the insulation stack. When the write gap layer is so extended the thickness of the second insulation layer 208 above the write coil layer can be reduced to the aforementioned preferred height. The overall stack height, including the third insulation layer, is approximately 2.75 μm. This height is significantly less than prior art stack heights even though the write coil layer has not been reduced in thickness. The only hard baked photoresist layer in the insulation stack is the second insulation layer 208. The reduced stack height significantly contributes to reducing reflective notching during construction of the second pole tip portion of the second pole piece 214. Further, the thickness of the second pole piece layer has been scaled down to a preferred range of 1.5 μm to 1.75 μm with an exemplary thickness of 1.6 μm. It should be noted that this thickness is the same as the thickness of the write coil layer 202.

This invention teaches that the thickness of the write coil layer 202 is equal to or greater than the thickness of the second pole piece layer 214. The reduced thickness of the second pole piece layer also significantly contributes to reducing reflective notching during construction of the second pole piece layer 214. The preferred range of the apex angle is 20° to 25° with an exemplary angle of 22° as shown in FIG. 9. After constructing the insulation stack 204, with the optional extended write gap layer as the third insulation layer 210, a seed layer is sputtered on the wafer in preparation for frame plating the second pole piece layer 214. A photoresist layer is then spun on the head which causes it to substantially planarize across the write head with a thickness greater in the pole tip region than in the yoke region. However, in the present invention the thickness of the photoresist layer in the pole tip region is significantly reduced over the prior art so as to minimize dispersion of light during the light exposure step of the photoresist layer.

Figure 10:
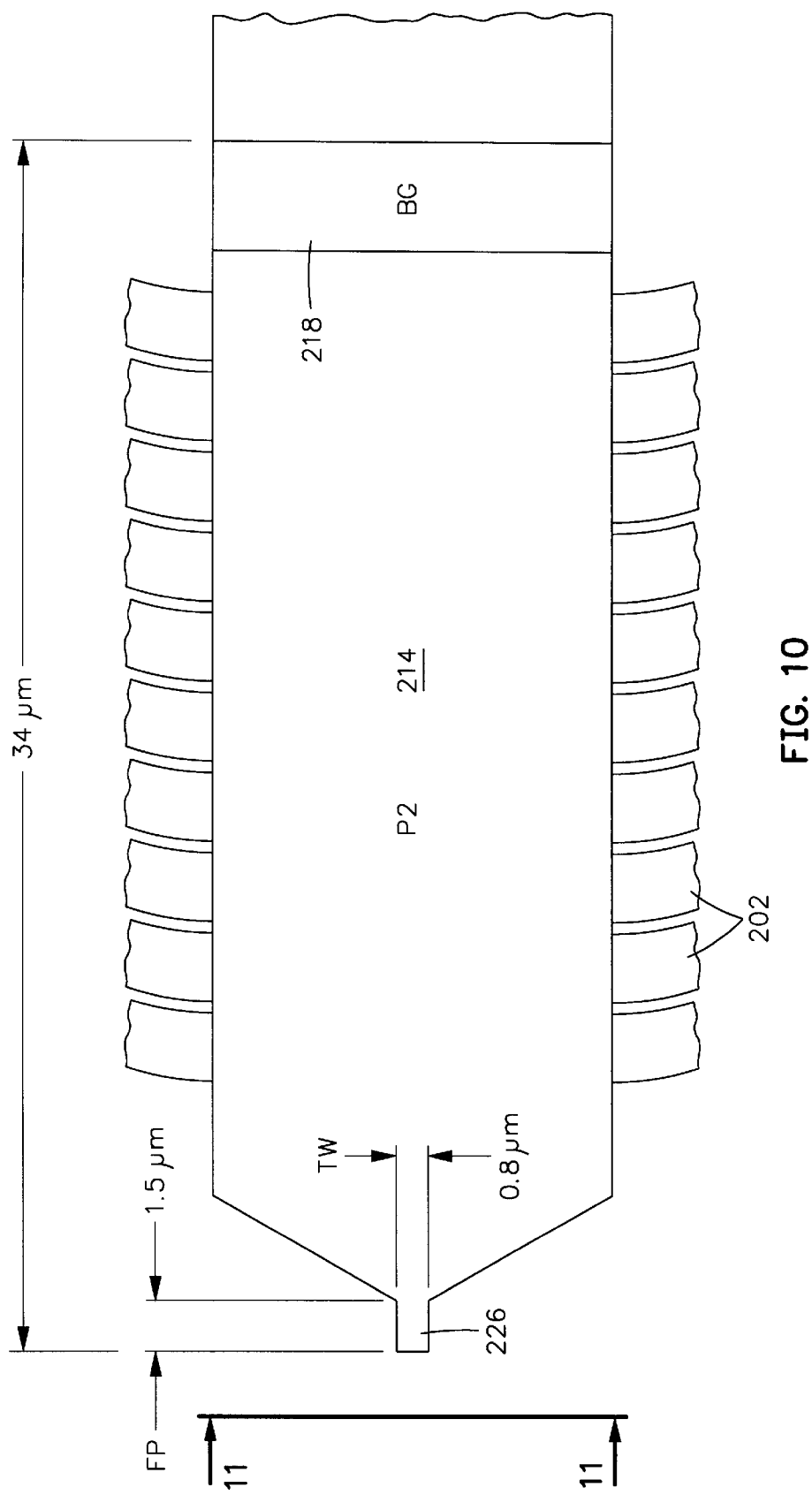
FIG. 10 is a view taken along plane 10—10 of FIG. 9 with extensions of the turns of the coil broken away.

It should be noted that the flare point is located at 1.5 μm from the ABS which can be seen in FIGS. 9 and 10. The insulation stack behind the flare point is the troublesome portion of the insulation stack for light reflection into areas adjacent the first and second side walls of the intended second pole tip. Since the apex angle has been maintained between 20° and 25° by the small height of the insulation stack, reflective notching during the light exposure step of the photoresist layer for frame plating the second pole piece layer 214 is substantially nonexistent. Accordingly, first and second side walls 222 and 224 of a second pole tip 226, shown in FIG. 11, will be well formed. This means that the side walls 222 and 224 will be parallel with respect to one another, perpendicular to a plane of the first pole piece layer 212 and perpendicular to the ABS. With the present invention the track width of the second pole tip 226 can be submicron such as in a range of 0.5 μm to 0.75 μm. The flare point can be in the range of 1.0 μm to 1.5 μm from the ABS without incurring saturation of the pole tip 226 which can best be seen in FIG. 10.

The write gap layer 216 has a preferred thickness range of 0.075 to 0.085 μm with an exemplary thickness of 0.08 μm. This determines the linear density of the write head. The present invention constructs the write gap layer 216 after construction of the insulation stack 204 except for the third insulation layer 210 which, in the present invention, is an extension of the write gap layer. Accordingly, the write gap layer at the ABS will not be altered by various processing steps in the construction of the insulation stack, such as etching of a seed layer after frame plating the write coil layer 202. Accordingly, the write gap layer 216 at the ABS can be made extremely thin and reliably dimensioned.

Another significant dimension scaled down is the pitch of the coil layer 202 which is the distance between the commencement of one turn to the commencement of an adjacent turn. The preferred range for the pitch of the coil layer is 2.5 μm to 3.0 μm with an exemplary pitch of 2.5 μm. With this scaled down pitch the length of the second pole piece layer can be shortened which, in turn, permits shortening of the first pole piece layer 212. Accordingly, with shortened first and second pole pieces 212 and 214, and with scaled down thicknesses of each of these layers, inductance of the head is significantly reduced which equates to a higher data rate. The lengths of the first and second pole piece layers 212 and 214 is further shortened by scaling down the distance of the coil layer 202 from the ABS. This distance is preferably in the range of 5 μm to 7 μm with an exemplary distance of 5.0 μm, as shown in FIG. 9. It has been found that this scaled down distance has been permitted by lowering the heights of the first and second insulation layers 206 and 208 and, optionally, the third insulation layer 210. Further, the low height of the insulation stack 204 permits the zero throat height (ZTH) to be aggressively placed close to the ABS. This is important from the standpoint of quickly separating the first and second pole piece layers so as to reduce leakage of flux therebetween. The preferred range for the ZTH is 0.25 μm to 0.5 μm with an exemplary ZTH of 0.35 μm, as shown in FIG. 9.

Several factors have significantly contributed to maintaining a low heat environment of the write head during its operation. One is that the first insulation layer 206 is made of a nonorganic material, as discussed hereinabove. This provides a greater heat sink for the heat than that provided by the typical baked photoresist layer. The alumina material of the extended write gap layer 210 also provides a better heat sink for the coil than hard baked photoresist. Further, the coil layer 202 has not been scaled down proportionately so that it does not generate undue heat. Accordingly, protrusion of the overcoat layer 220 at the ABS due to expansion of the insulation stack 204 has been obviated by the present invention.

Figure 11:
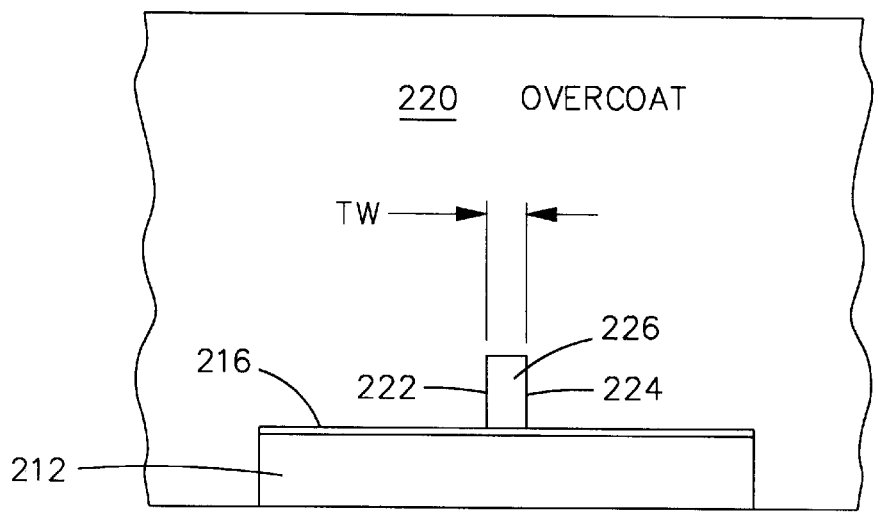
FIG. 11 is an ABS view of the write head taken along plane 11—11 of FIG. 10.

Below is a chart which lists the preferred dimensions, preferred ratios and preferred ranges for the various parameters of the present write head. The preferred dimensions are shown in FIGS. 9, 10 and 11 and have resulted in a write head with a recording density of 11.3 gigabits per square inch and a data rate of 60 megabytes per second. This is accomplished with a write coil layer with 10 turns, as shown in FIG. 9, a yoke length of 30 μm and yoke width of 17 μm. It should be understood that these preferred dimensions may be altered within the dimensions of the preferred ranges without departing from the spirit of the invention. With "X" equal to 0.5 μm the preferred ratios for the various layers are shown in the third column of the chart hereinbelow. In the preferred embodiment the material of the first pole piece layer 212 is a low moment material, such as $Ni_{80}Fe_{20}$, and the material of the second pole piece layer 214 is a high moment material, such as $Ni_{45}Fe_{55}$. The first insulation layer 206 is aluminum oxide ($Al_2O_3$), the coil layer 202 is copper (Cu), the second insulation layer 208 is baked photoresist and the third insulation layer 210, which is an extension of the write gap layer 216, is aluminum oxide ($Al_2O_3$). The overcoat layer is aluminum oxide ($Al_2O_3$).

| Parameter | Preferred Dimension (μm) | Preferred Ratio (Approximate) | Preferred Range |
| --- | --- | --- | --- |
| P2 thickness | 1.6 | 3X | 1.5–1.75 |
| I1 thickness | 0.3 | 0.6X | 0.25–0.30 |
| Coil thickness | 1.6 | 3X | 1.50–1.75 |
| I2 above coil | 0.60 | 1.2X | 0.5–0.65 |
| Write gap | .08 | 0.16X | .0750–.0850 |
| Stack height | 2.75 | 5.5X | 2.7–3.2 |
| ZTH | 0.35 | 0.7X | 0.25–0.5 |
| Coil to ABS | 5.0 | 10X | 5–7 |
| Apex angle | 22° | 20°–22° | 20°–25° |
| Flare point | 1.5 | 3X | 1–1.5 |
| Coil pitch | 2.5 | 2.5 | 2.0–3.0 |
| Track width | 0.8 | 1.6X | 0.5–0.75 |
| Coil turns | 10 | 10 | — |
| Yoke length | 30.0 | 60X | 25–35 |
| Yoke width | 17 | 34X | 15–25 |
| P1 thickness | 1.6 | 3.2X | 1.5–1.75 |

Figure 12:
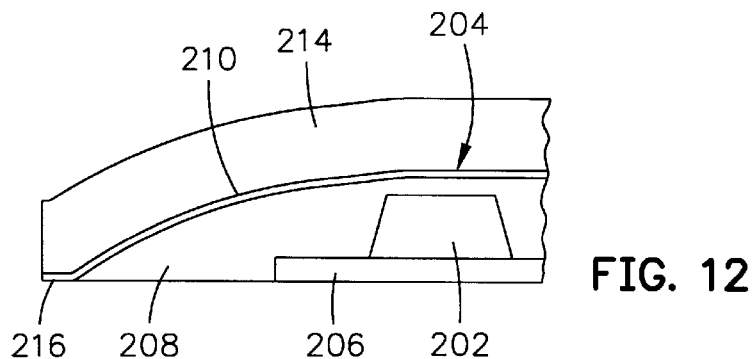
FIG. 12 is a cross-sectional side view of the front portion of a preferred embodiment of the present invention.

FIG. 12 illustrates a front portion of another embodiment of the present write head which includes the coil turn 202 embedded in the insulation stack 204. The insulation stack includes the first insulation layer 206, the second insulation layer 208 and, preferably, the third insulation 210 which is an extension of the write gap layer 216. In this embodiment the pitch of the coil layer is 2.6 μm and the commencement of the coil layer 202 from the ZTH is 6 μm. The flare point remains at 1.5 μm. The overall stack height is 2.6 μm. The distance from the ZTH to the back portion of the back gap is 41 μm for a 10-turn write coil, 34 μm for an 8-turn write coil and 28 μm for a 6-turn write coil.

Figure 13:
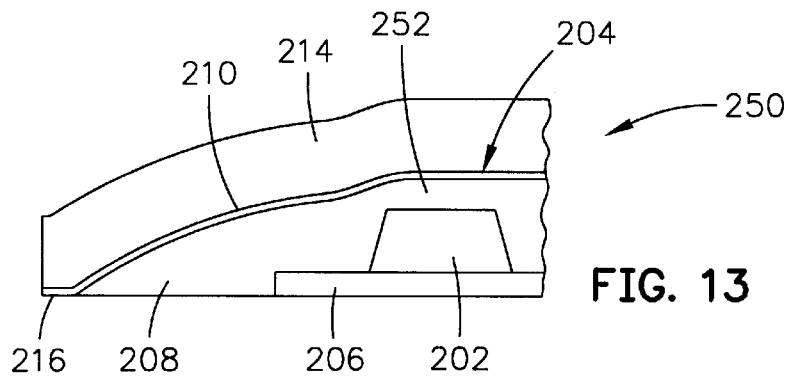
FIG. 13 is a cross-sectional side view of a front portion of another embodiment of the present invention.

FIG. 13 illustrates still another embodiment 250 of the present invention which is the same as the embodiment shown in FIG. 12 except a third insulation layer 252 of the insulation stack is an additional baked photoresist layer on top of the second insulation layer 208. In this embodiment the extension of the write gap layer 216 becomes a fourth insulation layer 210 for the insulation stack. In this instance, the stack height is increased from 3.0 μm to 3.4 μm. Further, the distance of the coil layer from the ZTH is increased from 6 μm in FIG. 12 to 7 μm. While the embodiment in FIG. 13 provides additional insulation between the coil layer and the second pole piece layer 212, it has been found that this additional insulation is not necessary. Accordingly, the embodiments shown in FIGS. 9–12 are preferred over the embodiments shown in FIG. 13.

Figure 14:
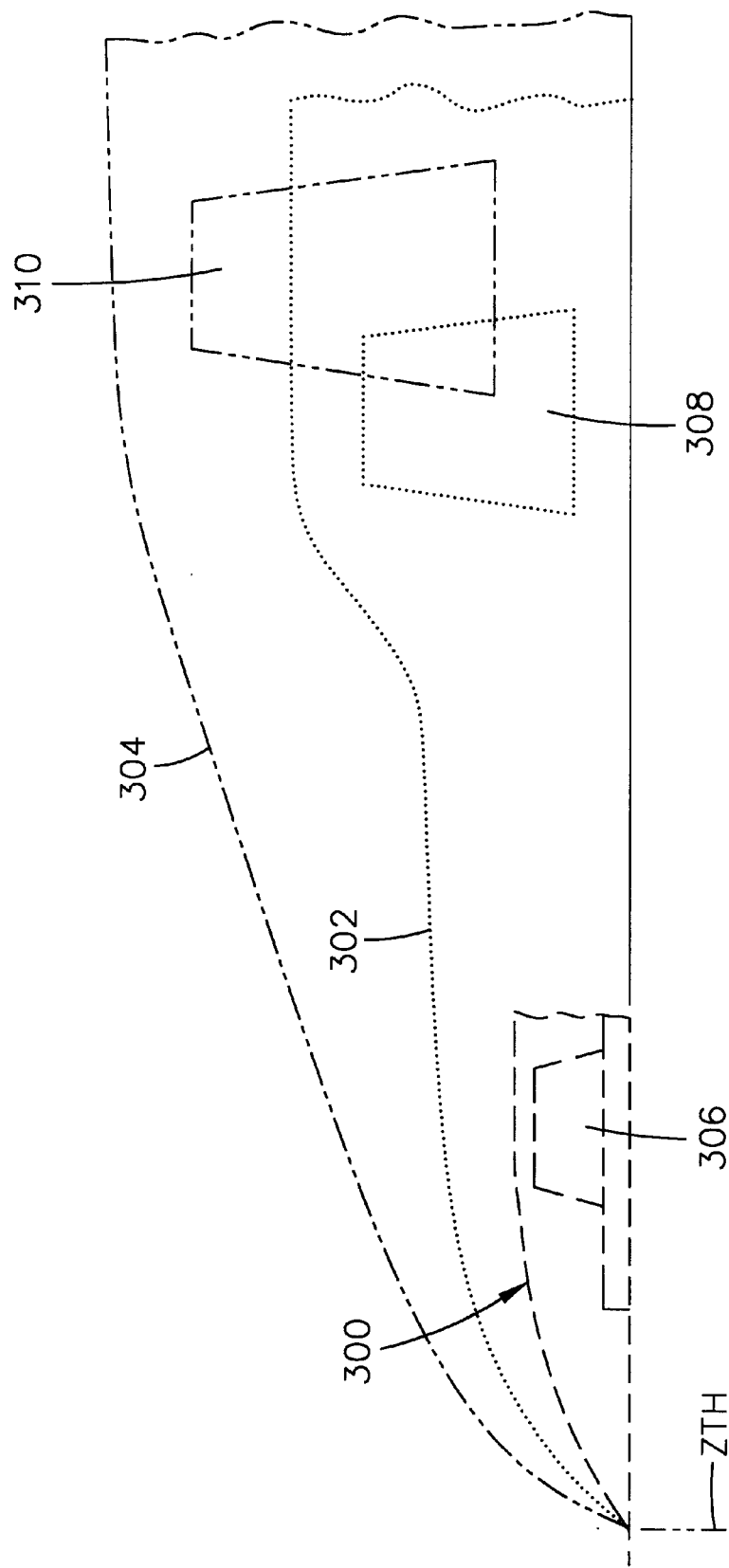
FIG. 14 is a schematic illustration of various heights of insulation stacks of the present invention and two other write heads investigated.

During our investigation we investigated the insulation stack 300 of the present head, as shown in FIG. 14, to an insulation stack 302 of a low profile type write head and an insulation stack 304 of a typical prior art write head. The present head investigated is typified by the head 200 shown in FIG. 9. It can be seen that the write coil layer 306 of the present write head is considerably closer to the ZTH than the locations of the write coils 308 and 310 of the other heads to the ZTH. This significantly decreases the lengths of the first and second pole pieces in the present write head. Further, it should be noted that the apex angles of the insulation stacks 302 and 304 are significantly greater at the ZTH than the apex angle of the insulation stack 300 of the present head. These increased apex angles will contribute to unwanted reflective notching of the second pole tip, as discussed hereinabove. Accordingly, the insulation stack 300 is considerably more favorable than the insulation stacks 302 and 304.

Figure 15:
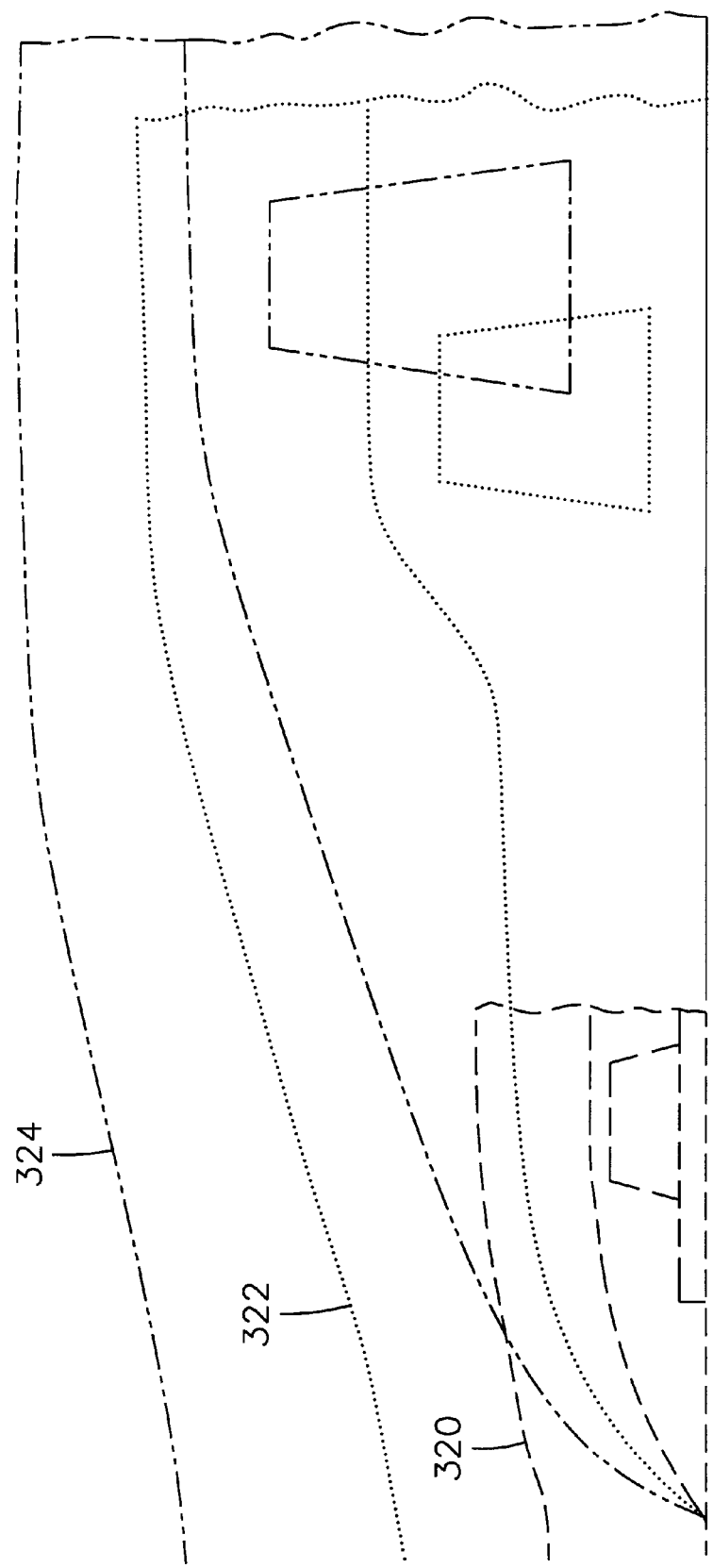
FIG. 15 is the same as FIG. 14 except various resist layers used for frame plating the second pole tip in the present invention as well as the two other write heads under investigation are shown.

FIG. 15 illustrates various levels of photoresist layers employed for frame plating the second pole piece layer of the present head and the other two heads investigated. It can be seen that the photoresist layer 320 is shallow in the pole tip region which is desirable for minimizing dispersion of light during the light exposure step of the photoresist layer. The photoresist layer 322 of the low profile head is considerably deeper in the pole tip region and the photoresist layer 324 of the prior art head 304 is still deeper in the pole tip region. Accordingly, the high aspect ratios of the insulation stacks and the thicker resist layers employed for frame plating the second pole piece for the other two heads investigated significantly increases the risk of reflective notching which degrades the track width density of the write head.

As shown in FIGS. 9–11 a method of making the write head includes forming the first pole piece layer 212 in the pole tip, yoke and back regions, forming the first insulation layer 206 of a nonorganic material on the first pole piece layer 212 in the yoke region, forming an electrically conductive coil layer 202 in the yoke region, forming a second insulation layer 208 of baked photoresist on the coil layer 202, forming the write gap layer 216 on the first pole piece layer 212 in the pole tip region and, preferably, on the second insulation layer 208 in the yoke region to form the third insulation layer 210, etching the write gap layer at the back gap region, forming the second pole piece layer 214 on the third insulation layer 210 in the yoke region, on the write gap layer 216 in the pole tip region and connecting the second pole piece layer 214 to the first pole piece layer 212 in the back gap region (BG) at 218. The forming of the coil layer 202 and the forming of the second pole piece layer 214 forms the coil layer 202 with a thickness that is equal to or greater than the thickness of the second pole piece layer 214. In the method all of the significant dimensions, such as the thickness of the write gap layer 216, the zero throat height, the distance of the coil layer 202 to the ABS, the pitch of the coil, the thicknesses of the first and second pole piece layers 212 and 214, the height of the insulation stack 204 and the flare point are all scaled down proportionally. Proportional scaling has not been applied to the write coil layer 202 so as to prevent undue heating of the head.

Clearly, other embodiments and modifications of this invention will readily occur to those of ordinary skill in the art upon reading these teachings. Therefore, this invention is to be limited only by the following claims, which include all such embodiments and modifications when viewed in conjunction with the above specification and accompanying drawings.

We claim:

1. A magnetic write head that has an air bearing surface (ABS), a zero throat height (ZTH), a flare point and a yoke region that is located between a pole tip region and a back gap region, the pole tip region extending from the ABS to the flare point and the yoke region extending from the flare point to the back gap region comprising:

first and second ferromagnetic pole piece layers extending throughout the pole tip, yoke and back gap regions, each pole piece layer having a thickness in the yoke region;

an insulation stack;

an electrically conductive coil layer embedded in the insulation stack, the coil layer having a thickness;

the insulation stack being located between the first and second pole piece layers in the yoke region;

a nonmagnetic write gap layer located between the first and second pole piece layers in the pole tip region;

the first and second pole piece layers being connected together in the back gap region;

the thickness of the coil layer being equal to or greater than the thickness of the second pole piece layer;

the insulation stack having a height about twice the thickness of the coil layer;

a distance from the ABS to the coil layer being about three time the thickness of the coil layer; and the ZTH being about ⅓ the thickness of the coil layer.

2. A magnetic write head that has an air bearing surface (ABS), a zero throat height (ZTH), a flare point and a yoke region that is located between a pole tip region and a back gap region, the pole tip region extending from the ABS to the flare point and the yoke region extending from the flare point to the back gap region comprising the steps of:

first and second ferromagnetic pole piece layers extending throughout the pole tip, yoke and back gap regions, each pole piece layer having a thickness in the yoke region;

an insulation stack;

an electrically conductive coil layer embedded in the insulation stack, the coil layer having a thickness;

the insulation stack being located between the first and second pole piece layers in the yoke region;

a nonmagnetic write gap layer located between the first and second pole piece layers in the pole tip region;

the first and second pole piece layers being connected together in the back gap region;

the thickness of the coil layer being equal to or greater than the thickness of the second pole piece layer; the insulation stack including:

a first insulation layer of inorganic material directly on the first pole piece layer in the yoke region;

the coil layer being directly on the first insulation layer; and a second insulation layer of baked photoresist directly on the coil layer and being the only baked photoresist layer in the insulation stack.

3. A magnetic write head as claimed in claim 2 wherein the insulation stack further includes:

a third insulation layer directly on the second insulation layer, the third insulation layer being an extension of the write gap layer.

4. A magnetic write head as claimed in claim 2 wherein the inorganic material is selected from the group aluminum oxide ($Al_2O_3$), silicon dioxide ($SiO_2$) and silicon (Si).

5. A magnetic write head as claimed in claim 4 including:

the insulation stack having a height about twice the thickness of the coil layer;

a distance from the ABS to the coil layer being about three time the thickness of the coil layer; and the ZTH being about ⅓ the thickness of the coil layer.

6. A magnetic write head as claimed in claim 5 wherein:

one of the insulation layers of the insulation stack is a ZTH defining insulation layer that has a sloping portion wherein a commencement of the sloping portion is located at the ZTH; and said magnetic head has an apex angle which is an angle between said commencement of said sloping portion and a plane defined by the first pole piece.

7. A magnetic write head as claimed in claim 6 wherein the magnetic head has an apex angle of 22°.

8. A magnetic write head as claimed in claim 7 wherein the insulation stack further includes:

a third insulation layer directly on the second insulation layer, the third insulation layer being an extension of the write gap layer.

9. A magnetic write head as claimed in claim 8 wherein the thickness of the first pole piece layer is about the same thickness as the second pole piece layer.

10. A magnetic write head as claimed in claim 9 wherein the first pole piece layer is a low moment material and the second pole piece layer is a high moment material.

11. A magnetic write head as claimed in claim 10 wherein the low moment material is $Ni_{80}Fe_{20}$ and the high moment material is $Ni_{45}Fe_{55}$.

12. A magnetic write head as claimed in claim 11 including:

the first insulation layer having a thickness about 0.2 the thickness of the coil layer;

the second insulation layer having a height above the coil layer about 0.40 the thickness of the coil layer; and the write gap layer having a thickness about 1/20 the thickness of the coil layer.

13. A magnetic write head as claimed in claim 12 wherein a track width of the second pole piece in the pole tip region is 0.5–0.75 µm.

14. A magnetic head that has an air bearing surface (ABS), a zero throat height (ZTH), a flare point and a yoke region that is located between a pole tip region and a back gap region, the pole tip region extending from the ABS to the flare point and the yoke region extending from the flare point to the back gap region comprising:

first and second ferromagnetic pole piece layers extending throughout the pole tip, yoke and back gap regions, each pole piece layer having a thickness in the yoke region;

an insulation stack;

an electrically conductive coil layer embedded in the insulation stack, the coil layer having a thickness;

the insulation stack being located between the first and second pole piece layers in the yoke region;

a nonmagnetic write gap layer located between the first and second pole piece layers in the pole tip region;

the first and second pole piece layers being connected together in the back gap region;

the thickness of the coil layer being equal to or greater than the thickness of the second pole piece layer; the insulation stack including:

a first insulation layer of inorganic material directly on the first pole piece layer in the yoke region;

the coil layer being directly on the first insulation layer; and a second insulation layer of baked photoresist directly on the coil layer and being the only baked photoresist layer in the insulation stack;

a read sensor and first and second lead layers connected to the read sensor;

nonmagnetic electrically insulative first and second read gap layers;

the read sensor and the first and second lead layers being located between the first and second read gap layers;

first and second shield layer; and the first and second gap layers being located between the first and second shield layers.

15. A magnetic head as claimed in claim 14 wherein the inorganic material is selected from the group aluminum oxide ($Al_2O_3$), silicon dioxide ($SiO_2$) and silicon (Si).

16. A magnetic head as claimed in claim 15 wherein the insulation stack further includes:

a third insulation layer directly on the second insulation layer, the third insulation layer being an extension of the write gap layer.

17. A magnetic head as claimed in claim 16 including:

the insulation stack having a height about twice the thickness of the coil layer;

a distance from the ABS to the coil layer being about three time the thickness of the coil layer; and the ZTH being about 1/3 the thickness of the coil layer.

18. A magnetic head as claimed in claim 17 wherein:

one of the insulation layers of the insulation stack is a ZTH defining insulation layer that has a sloping portion wherein a commencement of the sloping portion is located at the ZTH; and said magnetic head has an apex angle which is an angle between said commencement of said sloping portion and a plane defined by the first pole piece.

19. A magnetic head as claimed in claim 18 wherein the magnetic head has an apex angle of 22°.

20. A magnetic head as claimed in claim 19 wherein the thickness of the first pole piece layer is about the same thickness as the second pole piece layer.

21. A magnetic head as claimed in claim 20 wherein the first pole piece layer is a low moment material and the second pole piece layer is a high moment material.

22. A magnetic disk drive that includes at least one magnetic head which has a combined read head and write head wherein the write head has an air bearing surface (ABS), a zero throat height (ZTH), a flare point and a yoke region that is located between a pole tip region and a back gap region, the pole tip region extending from the ABS to the flare point and the yoke region extending from the flare point to the back gap region, the disk drive comprising:

the read head including:

a read sensor and first and second lead layers connected to the read sensor;

nonmagnetic electrically insulative first and second read gap layers;

the read sensor and the first and second lead layers being located between the first and second read gap layers;

first and second shield layers; and the first and second gap layers being located between the first and second shield layers;

the write head including:

the second shield layer being employed as a first pole piece layer that has a thickness and that extends throughout the pole tip, yoke and back gap regions;

a second ferromagnetic pole piece layer having a thickness and extending throughout the pole tip, yoke and back gap regions;

an insulation stack;

an electrically conductive coil layer embedded in the insulation stack, the coil layer having a thickness;

the insulation stack being located between the first and second pole piece layers in the yoke region;

the insulation stack including:

a first insulation layer of inorganic material directly on the first pole piece layer in the yoke region;

the coil layer being directly on the first insulation layer; and a second insulation layer of baked photoresist directly on the coil layer and being the only baked photoresist layer in the insulation stack;

a nonmagnetic write gap layer located between the first and second pole piece layers in the pole tip region;

the first and second pole piece layers being connected together in the back gap region; and the thickness of the coil layer being equal to or greater than the thickness of the second pole piece layer;

a housing;

a magnetic disk rotatably supported in the housing;

a support mounted in the housing for supporting the magnetic head with its ABS facing the magnetic disk so that the magnetic head is in a transducing relationship with the magnetic disk;

means for rotating the magnetic disk;

positioning means connected to the support for moving the magnetic head to multiple positions with respect to said magnetic disk; and processing means connected to the magnetic head, to the means for rotating the magnetic disk and to the positioning means for exchanging signals with the magnetic head, for controlling movement of the magnetic disk and for controlling the position of the magnetic head.

23. A magnetic disk drive as claimed in claim 22 wherein the inorganic material is selected from the group aluminum oxide ($Al_2O_3$), silicon dioxide ($SiO_2$) and silicon (Si).

24. A magnetic disk drive as claimed in claim 23 wherein the insulation stack further includes:

a third insulation layer directly on the second insulation layer, the third insulation layer being an extension of the write gap layer.

25. A magnetic disk drive as claimed in claim 24 including:

the insulation stack having a height about 1.70 the thickness of the coil layer;

a distance from the ABS to the coil layer being about three time the thickness of the coil layer; and the ZTH being about ⅓ the thickness of the coil layer.

26. A magnetic disk drive as claimed in claim 25 wherein:

one of the insulation layers of the insulation stack has a ZTH defining insulation layer that has a sloping portion wherein a commencement of the sloping portion is located at the ZTH; and said magnetic head has an apex angle which is an angle between said commencement of said sloping portion and a plane defined by the first pole piece.

27. A magnetic disk drive as claimed in claim 26 wherein the magnetic head has an apex angle of 22°.

28. A magnetic disk drive as claimed in claim 27 wherein the thickness of the first pole piece layer is about the same thickness as the second pole piece layer.

29. A magnetic disk drive as claimed in claim 28 wherein the first pole piece layer is a low moment material and the second pole piece layer is a high moment material.

30. A method of making a magnetic write head that has an air bearing surface (ABS), a zero throat height (ZTH), a flare point and a yoke region that is located between a pole tip region and a back gap region, the pole tip region extending from the ABS to the flare point and the yoke region extending from the flare point to the back gap region comprising the steps of:

forming a ferromagnetic first pole piece layer in the pole tip, yoke and back gap regions;

forming an insulation stack which includes a first insulation layer formed on the first pole piece layer in the yoke region, an electrically conductive coil layer with a thickness formed on the first insulation layer and a second insulation layer formed on the coil layer;

forming a nonmagnetic write gap layer on the first pole piece layer in the pole tip region;

forming a ferromagnetic second pole piece layer on the second insulation layer in the yoke region, on the write gap layer in the pole tip region and connected to the first pole piece layer in the back gap region;

the forming of the coil layer and the forming of the second pole piece layer forming the coil layer with a thickness that is equal to or greater than a thickness of the second pole piece layer;

said forming of the insulation stack providing the insulation stack with a height that is about twice the thickness of the coil layer;

said forming of the coil layer forming the coil layer with a distance from the ABS to the coil layer about three time the thickness of the coil layer; and forming the ZTH with a height about ⅓ the thickness of the coil layer.

31. A method of making a magnetic write head that has an air bearing surface (ABS), a zero throat height (ZTH), a flare point and a yoke region that is located between a pole tip region and a back gap region, the pole tip region extending from the ABS to the flare point and the yoke region extending from the flare point to the back gap region comprising:

forming a ferromagnetic first pole piece layer in the pole tip, yoke and back gap regions;

forming an insulation stack which includes a first insulation layer formed on the first pole piece layer in the yoke region, an electrically conductive coil layer with a thickness formed on the first insulation layer and a second insulation layer formed on the coil layer;

forming a nonmagnetic write gap layer on the first pole piece layer in the pole tip region;

forming a ferromagnetic second pole piece layer on the second insulation layer in the yoke region, on the write gap layer in the pole tip region and connected to the first pole piece layer in the back gap region;

the forming of the coil layer and the forming of the second pole piece layer forming the coil layer with a thickness that is equal to or greater than a thickness of the second pole piece layer;

the first insulation layer being inorganic material and being formed directly on the first pole piece layer in the yoke region;

the coil layer being formed directly on the first insulation layer; and the second insulation layer being baked photoresist and being formed directly on the coil layer and being the only baked photoresist layer in the insulation stack.

32. A method as claimed in claim 31 wherein the insulation stack is further made by:

forming a third insulation layer directly on the second insulation layer wherein the third insulation layer is an extension of the write gap layer.

33. A method as claimed in claim 31 wherein the inorganic material is selected from the group aluminum oxide ($Al_2O_3$), silicon dioxide ($SiO_2$) and silicon (Si).

34. A method as claimed in claim 33 including:

forming the insulation stack with a height that is about twice the thickness of the coil layer;

forming the coil layer with a distance from the ABS to the coil layer being about three time the thickness of the coil layer; and forming the ZTH with a thickness about ⅓ the thickness of the coil layer.

35. A method as claimed in claim 34 including the steps of:

forming one of the insulation layers of the insulation stack with a ZTH defining insulation layer that has a sloping portion wherein a commencement of the sloping portion is located at the ZTH; and forming said magnetic head with an apex angle which is an angle between said commencement of said sloping portion and a plane defined by the first pole piece.

36. A method as claimed in claim 35 wherein the magnetic head is formed with an apex angle of 22°.

37. A method as claimed in claim 36 wherein the insulation stack is further made by:

forming a third insulation layer directly on the second insulation layer wherein the third insulation layer is an extension of the write gap layer.

38. A method as claimed in claim 37 wherein the first pole piece layer is formed with a thickness about the same thickness as the second pole piece layer.

39. A method as claimed in claim 38 wherein the first pole piece layer is formed of a low moment material and the second pole piece layer is formed of a high moment material.

40. A method as claimed in claim 39 wherein the low moment material is $Ni_{80}Fe_{20}$ and the high moment material is $Ni_{45}Fe_{55}$.

41. A method as claimed in claim 40 including:

forming the first insulation layer with a thickness about 0.2 the thickness of the coil layer;

forming the second insulation layer with a height above the coil layer about 0.40 the thickness of the coil layer; and forming the write gap layer with a thickness about 1/20 the thickness of the coil layer.

42. A method as claimed in claim 41 including:

forming the second pole piece in the pole tip region with a track width that is 0.5–0.75 $\mu$m.

* * * * *